(12) United States Patent
Teramoto et al.

(10) Patent No.: US 8,756,630 B2
(45) Date of Patent: Jun. 17, 2014

(54) IMAGING DISTRIBUTION APPARATUS AND IMAGING DISTRIBUTION METHOD

(75) Inventors: Keiichi Teramoto, Kawasaki (JP); Shirou Wakayama, Kawasaki (JP); Satoshi Ozaki, Kawasaki (JP); Isao Takeyasu, Yokohama (JP); Yoshiki Terashima, Kawasaki (JP); Kenji Odaka, Yokohama (JP); Eiji Tokita, Fuchu (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 1312 days.

(21) Appl. No.: 12/407,274

(22) Filed: Mar. 19, 2009

(65) Prior Publication Data

US 2009/0249425 A1 Oct. 1, 2009

(30) Foreign Application Priority Data

Mar. 31, 2008 (JP) ................................. 2008-093647

(51) Int. Cl.
| | |
|---|---|
| *H04N 5/445* | (2011.01) |
| *H04N 7/173* | (2011.01) |
| *G06F 3/00* | (2006.01) |
| *G06F 13/00* | (2006.01) |
| *H04N 21/2668* | (2011.01) |
| *H04N 21/4722* | (2011.01) |
| *H04N 21/61* | (2011.01) |
| *H04N 21/2665* | (2011.01) |

(52) U.S. Cl.
CPC ........... *H04N 7/173* (2013.01); *H04N 21/2668* (2013.01); *H04N 21/4722* (2013.01); *H04N 21/6125* (2013.01); *H04N 21/2665* (2013.01)
USPC ........................................... 725/38; 725/120

(58) Field of Classification Search
None
See application file for complete search history.

(56) References Cited

U.S. PATENT DOCUMENTS

| | | | | |
|---|---|---|---|---|
| 2002/0040475 | A1* | 4/2002 | Yap et al. | 725/39 |
| 2006/0064716 | A1* | 3/2006 | Sull et al. | 725/37 |
| 2006/0156352 | A1* | 7/2006 | Smith et al. | 725/86 |
| 2008/0022335 | A1* | 1/2008 | Yousef | 725/100 |
| 2008/0127253 | A1* | 5/2008 | Zhang et al. | 725/35 |
| 2008/0216116 | A1* | 9/2008 | Pekonen et al. | 725/39 |
| 2011/0265120 | A1* | 10/2011 | Vaysman et al. | 725/39 |

FOREIGN PATENT DOCUMENTS

| | | |
|---|---|---|
| CN | 1547713 A | 11/2004 |
| JP | 2001-25024 A | 1/2001 |
| JP | 2001025024 A * | 1/2001 |
| JP | 2004-343683 | 12/2004 |
| JP | 2007-74158 | 3/2007 |

OTHER PUBLICATIONS

Chinese Office Action dated Oct. 8, 2010 (with English translation) from corresponding CN 200910132544.2.

* cited by examiner

*Primary Examiner* — Brian T Pendleton
*Assistant Examiner* — Ryan Stronczer
(74) *Attorney, Agent, or Firm* — Ohlandt, Greeley, Ruggiero & Perle, L.L.P.

(57) ABSTRACT

An imaging distribution apparatus includes a reception unit configured to receive a distribution request for distribution of a specific program from a client apparatus via a network, a program scenario acquisition unit configured to acquire a program scenario corresponding to the specific program requested for by the distribution request, a content acquisition unit configured to acquire a plurality of information contents based on the program scenario, a conversion unit configured to convert the information contents to image scene based on the program scenario, an encoding unit configured to encode the image scene, to generate a stream, and a stream distribution unit configured to distribute the stream to the client apparatus via the network.

10 Claims, 14 Drawing Sheets

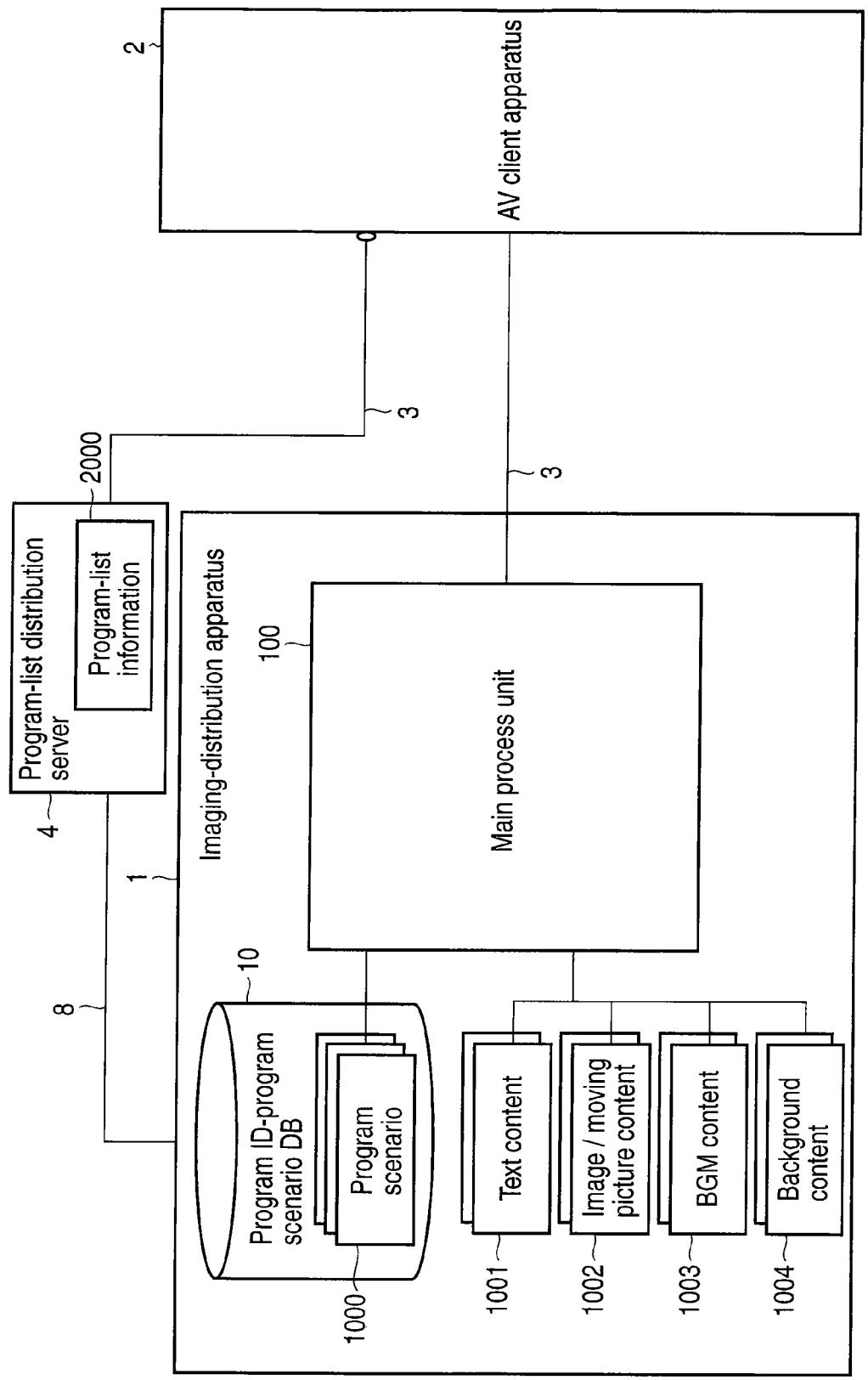
F I G. 1

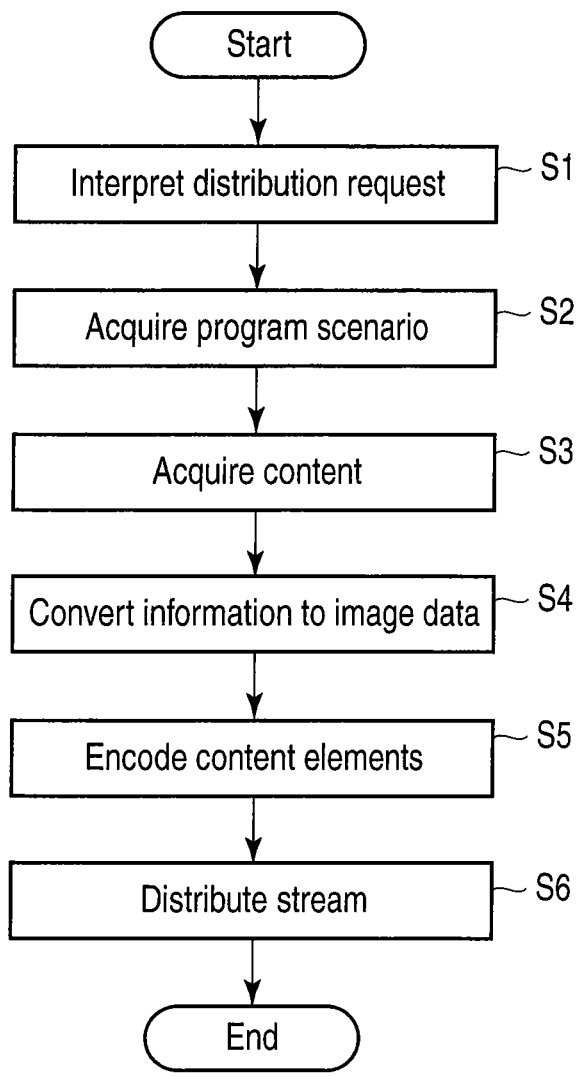
F I G. 3

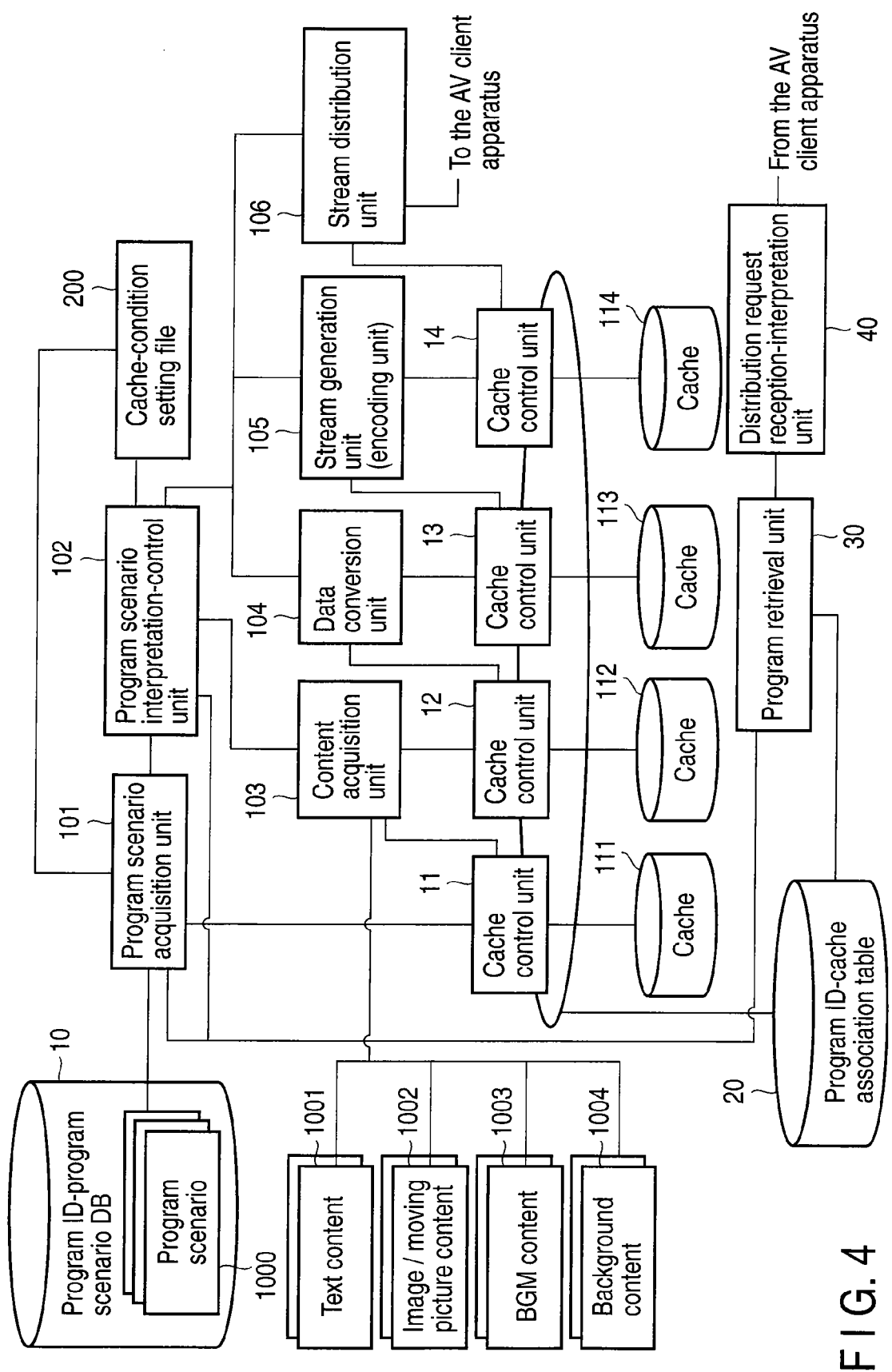
F I G. 4

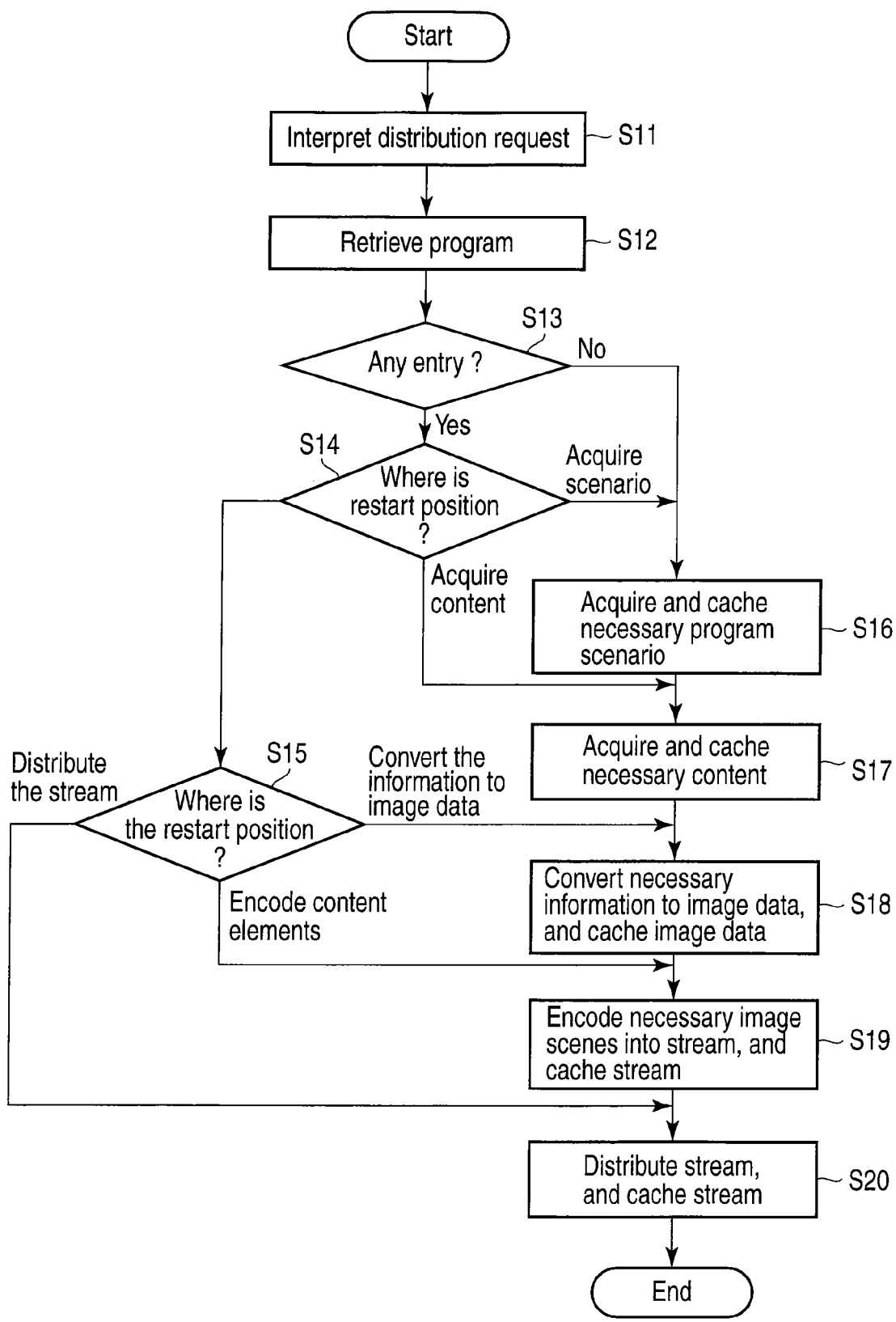
F I G. 5

| Program ID | Restart position | Cache 111 | Cache 112 | Cache 113 | Cache 114 |
|---|---|---|---|---|---|
| 10010 | Stream distribution unit 106 | — | — | — | 10010.mp4 |
| 10013 | Content acquisition unit 103 | news_main.xml news_gmg.xml | — | — | — |
| 10014 | Content acquisition unit 103 | blog_main.xml blog_gmg.xml | 10014s2bgm.mp3 10014s2bgimg.jpg | 10014s1.avi 10014s3.avi | |

F I G. 6

```
<?xml version="1.0" encoding="UTF-8" ?>
<program name="News" version="0.1">

<plugins>
  <plugin name="Subscription_RSS">
    <option id="url"  value=http://www3.example.com/rss/index.rdf/>
    <option name="return" value="example_array" />
  </plugin>
  </plugin name="Filter_removeTag">
    <option name="src" value="$example_array" />
    <option name="returm" valve="example_array" />
  </plugin>
  </plugin name="Filter_ToSpeak">
    <option name="src" value="$example_array" />
    <option name="text" value="description" />
    <option name="format" value="wav" />
    <option name="return" value="example_array" />
  </plugin>
   </plugin name="Presentation_Array_Scene">
     <option name="src" value="$example_array"/>
     <option name="gmgfile" value="news_gmg.xml" />
   </plugin>
</plugins>

</program>
```

FIG. 7

```
<?xml version="1.0" encoding="UTF-8" ?>
<gmg title="Text-test" version="0.1">
<Image id="bgimage" url="imgs/bg_stars.png" x="50" y="0"  width="1115" height="720" />
<Image id="photo" url="http://www3.example.com/photos/picxxxx.png" x="660" y="120" width="400"  height="300" />
<Text id="title" text="$title" X="30" y="60" size="60">
  <slidein direction="left" dur="0.5" />
</Text>
<Text id="desc" text="$description" X="10" y="230" size"15">
  <fadeintop dur="0.5" />
</Text>
<Box id="box" x="20" y="100" width="690" height="340" />
<Sleep dur="5" />
</gmg>
```

FIG. 9

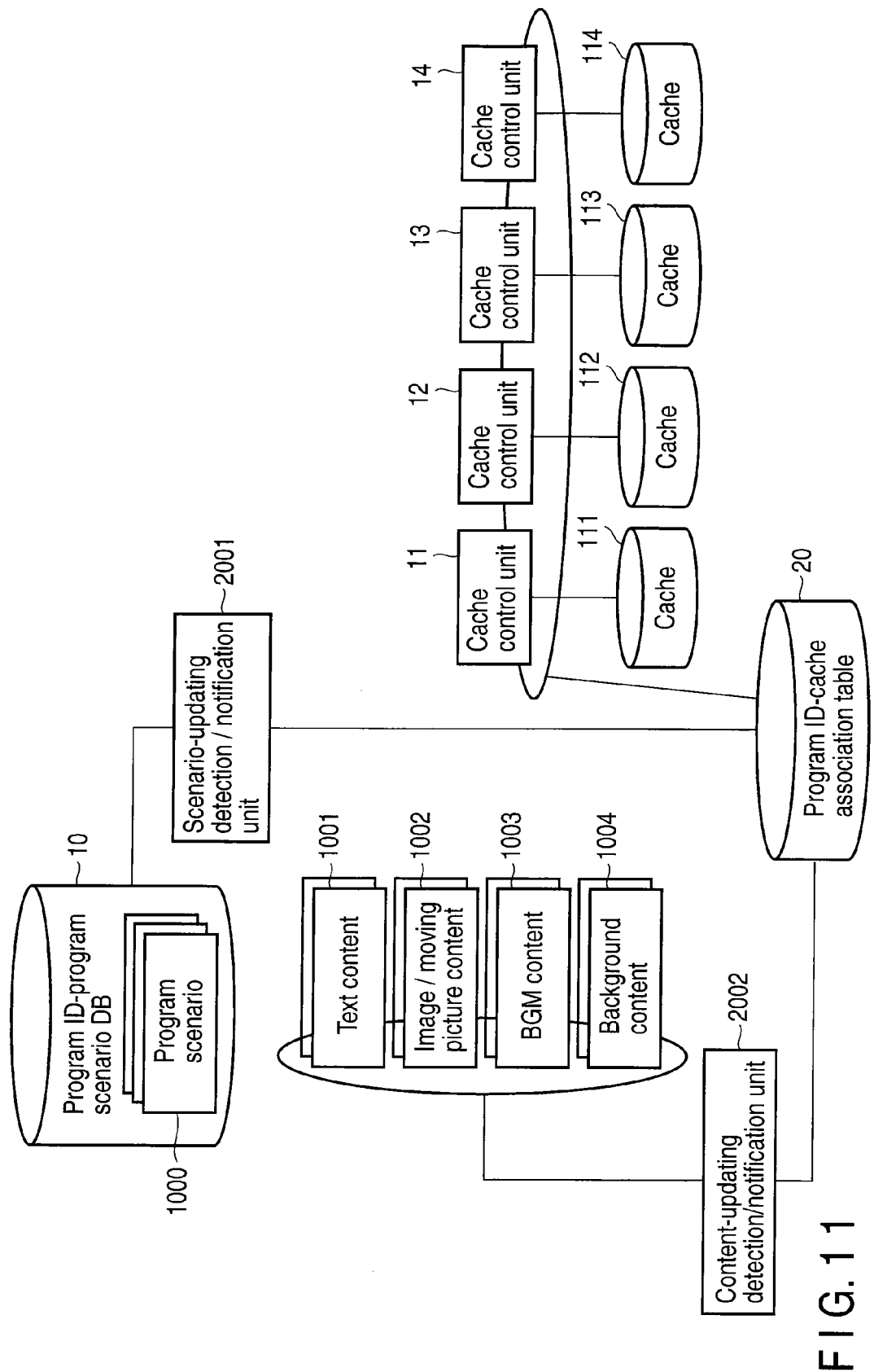
F I G. 11

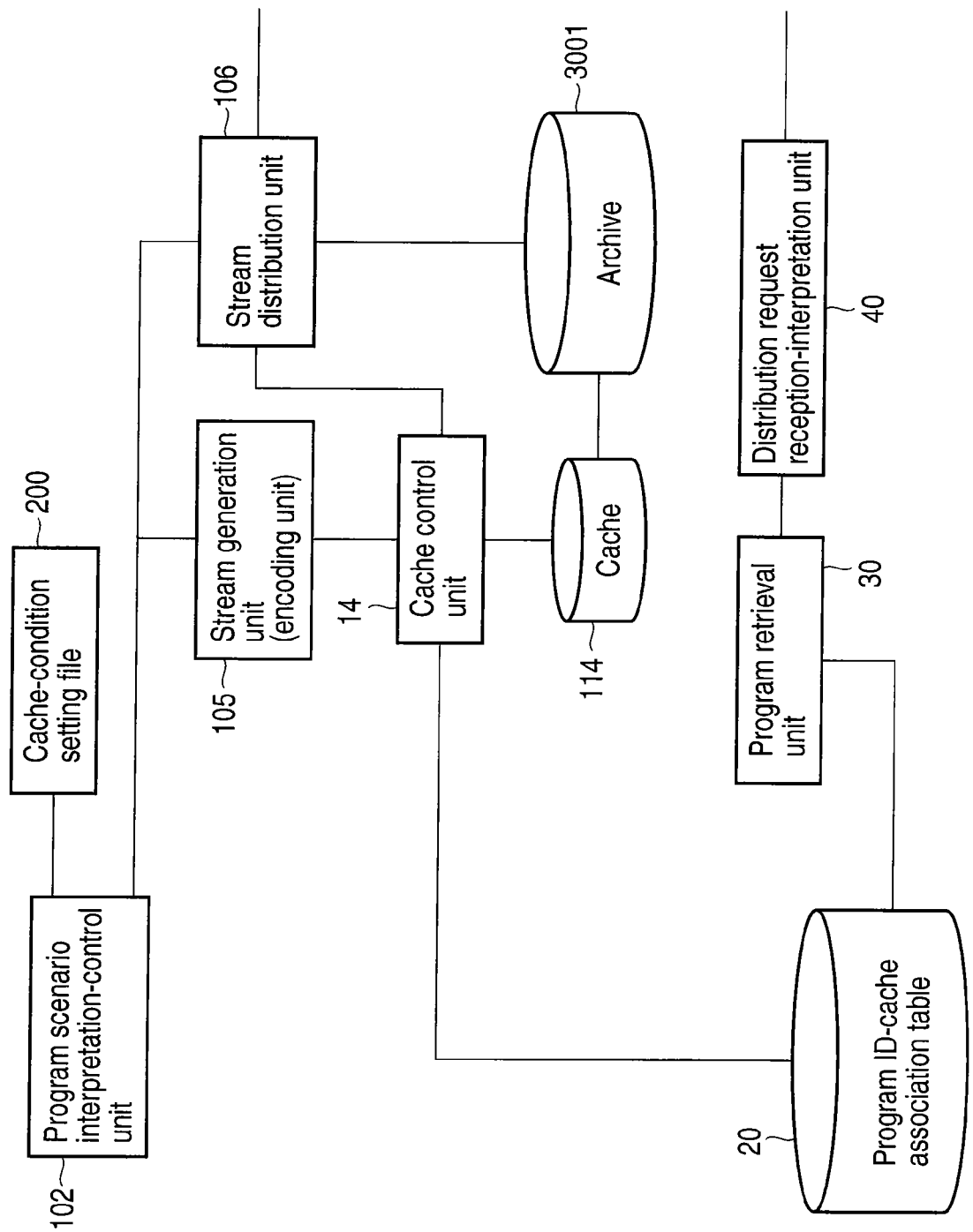
F I G. 13

| Program ID | Restart position | Cache 111 | Cache 112 | Cache 113 | Cache 114 | Archive 3001 |
|---|---|---|---|---|---|---|
| 10010 | Stream distribution unit 106 | — | — | — | 10010.mp4 | |
| 10013 | Content acquisition unit 103 | news_main.xml news_gmg.xml | — | — | — | |
| 10014 | Content acquisition unit 103 | blog_main.xml blog_gmg.xml | 10014s2bgm.mp3 10014s2bgimg.jpg | 10014s1.avi 10014s3.avi | — | |
| 10020 | Stream distribution unit 106 | — | — | — | — | 10020.mp4 |

F I G. 1 4

IMAGING DISTRIBUTION APPARATUS AND IMAGING DISTRIBUTION METHOD

CROSS-REFERENCE TO RELATED APPLICATIONS

This application is based upon and claims the benefit of priority from prior Japanese Patent Application No. 2008-093647, filed Mar. 31, 2008, the entire contents of which are incorporated herein by reference.

BACKGROUND OF THE INVENTION

1. Field of the Invention

This invention relates to an imaging distribution apparatus and imaging distribution method for converting information to image data and distributing the image data.

2. Description of the Related Art

TV receivers may be used in various ways. For example, a user may keep a TV receiver on for only some time he or she is looking and listening carefully at a specific TV program, or for only some time he or she is watching the program while doing something else. Alternatively, the user may keep the TV receiver on at all times, and repeat arbitrarily only listening to sound broadcast, glancing at the screen while listening to the sound, or looking carefully at the screen while listening to the sound. Otherwise, the user may keep the TV receiver on at all times, not attentively watching the program, but using the program as an ornamental image and a background music piece. TV receivers are kept on, in various places such as houses, stores and public facility.

In TV broadcasting service, there is a limitation that TV receivers can play back only the information to be transmitted by the TV stations. They can indeed receive and play back TV-broadcast information, but only a few programs that the existing broadcasting stations are broadcasting.

Now we can receive many information items other than the information items the TV stations broadcast. The existing networks, particularly the Internet, now enable us to obtain a variety of information, drastically changing the distribution of information. At present, an environment is being built, in which people in general (i.e., non-professional users) all over the world can not only receive information, but also transmit information. On the Internet, information items of various descriptions, from the political and economic reports to pleasure guides such as "Good Restaurants I Dined Last Week." In addition, the Internet now enables users to receive various information items, compile them, express opinions on them, and other users to give comments on the opinions. An information distribution system in which ordinary people play leading roles can be said to be being built on a large data network called "Internet."

Far more information is distributed on the Internet than from TV stations. Through the Internet, however, people cannot acquire information in such a passive way as obtaining information through TV receivers. To acquire information through the Internet, the user must be more active, sitting at desk, operating the keyboard to input retrieval key words, and then clicking the mouse. (In order to enjoy watching a TV program, he or she only needs to turn on the TV switch and the channel button at most, while lying on the sofa.) This difference may be best expressed by the everyday phrase of "We watch TV and obtains information through the Internet."

To acquire desired information through the Internet and browse the information, the user should perform an action, first determining what kind of information he or she really wants, then inputting keywords related to the information he or she wants, thereby retrieving some information items, and finally selecting the very item he or she wants.

JP-A 2004-343683(KOKAI) and JP-A 2007-074158 (KOKAI) disclose apparatuses that handle multimedia data. These apparatuses display video data and text data and generate audio data, but only in their original form.

In order change the information displayed on the Internet browser screen, the user must perform an action. (If the user only activates the browser screen, the screen will keep displaying the same information at most.) Without the user's action, nothing will change on the browser screen.

BRIEF SUMMARY OF THE INVENTION

The invention has been made in view of the foregoing. An object of the invention is to provide an imaging distribution apparatus and imaging distribution method for converting information to image data (program) and distributing the image data and not requiring any active operation on the part of the user.

According to one aspect of this invention, there is provided an imaging distribution apparatus which includes a reception unit configured to receive a distribution request for distribution of a specific program from a client apparatus via a network, a program scenario acquisition unit configured to acquire a program scenario corresponding to the specific program requested for by the distribution request, a content acquisition unit configured to acquire a plurality of information contents based on the program scenario, a conversion unit configured to convert the information contents to image scene based on the program scenario, an encoding unit configured to encode the image scene, to generate a stream, and a stream distribution unit configured to distribute the stream to the client apparatus via the network.

BRIEF DESCRIPTION OF THE SEVERAL VIEWS OF THE DRAWING

FIG. 1 is a diagram showing an exemplary overall configuration of a program distribution system according to a first embodiment;

FIG. 3 is a flowchart explaining an exemplary operating sequence of an imaging distribution apparatus for converting information to image data and distributing the image data, which has no cache;

FIG. 4 is a diagram showing an exemplary overall configuration of the imaging distribution apparatus, which has caches;

FIG. 5 is a flowchart explaining an exemplary operating sequence of the imaging distribution apparatus, which has caches;

FIG. 6 is a diagram showing an example of a program ID-cache association table;

FIG. 7 is a diagram showing an exemplary description of a main program scenario;

FIG. 9 is a diagram illustrating an exemplary description of a sub-scenario for instructing operations;

FIG. 11 a diagram showing an exemplary overall configuration of a imaging distribution according to a second embodiment;

FIG. 13 is a diagram showing an exemplary overall configuration of a imaging distribution apparatus according to a third embodiment; and FIG. 14 is a diagram showing an example of a program ID-cache association table used in the third embodiment.

DETAILED DESCRIPTION OF THE INVENTION

Figure 2:
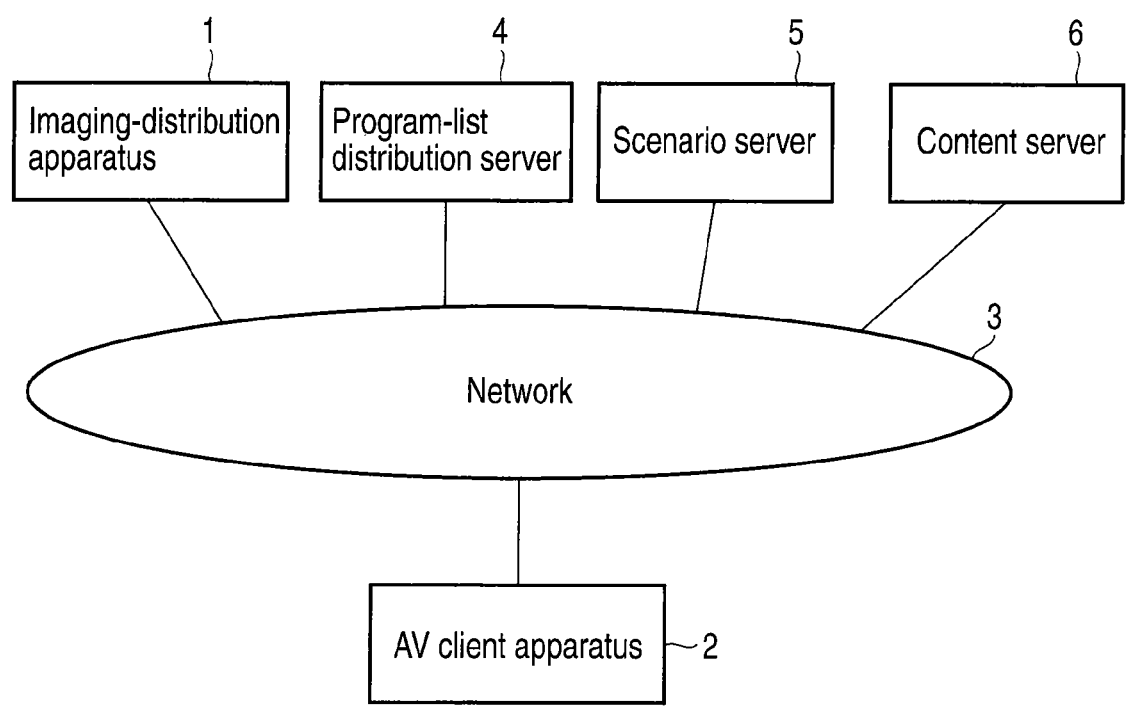
FIG. 2 is a diagram showing another exemplary configuration of the program distribution system.

Embodiments of this invention will be described with reference to the accompanying drawings.

(First Embodiment)

There will now be described an exemplary overall configuration of a program distribution system according to this embodiment referring to FIG. 1.

As shown in FIG. 1, the program distribution system has a imaging distribution apparatus 1, an AV client apparatus 2, a network 3, and a program-list distribution server 4.

The network 3 connects the imaging distribution apparatus 1 is connected to the AV client apparatus 2 by the network 3. The network 2 is, for example, the Internet. Nonetheless, the network 3 is not limited to the Internet, and can be any other network.

The imaging distribution apparatus 1 incorporates a main process unit 100. The main process unit 100 is connected to the network 3. The unit 100 is configured to perform various processes, such as conversion of information to image data and distribution of the image data, in response to a distribution request supplied from the AV client apparatus 2, as will be described later in detail. In the imaging distribution apparatus 1, the main process unit 100 is connected to a program ID-program scenario database (DB) 10. The program ID-program scenario DB 10 stores program IDs, i.e., identifiers of programs, and scenarios 1000 of the programs, in correspondence with each other. The main process unit 100 is connected to various content storages, too, which stores text content 1001, image/moving picture content 1002, BGM content 1003, and background content 1004, as shown in FIG. 1.

As shown in FIG. 1, the program ID-program scenario DB 10 is included in the imaging distribution apparatus 1. The program scenarios may be read from outside the imaging distribution apparatus 1 or generated in the imaging distribution apparatus 1. Moreover, another program ID-program scenario DB or other program ID-program scenario DBs may be provided on the network 3 or a LAN (not shown). Alternatively, the program ID-program scenario DB 10 may be replaced by one or more program ID-program scenarios DBs that are provided on the network 3 or the LAN. For example, one or more scenario servers storing and providing scenarios 1000 may be provided.

As shown in FIG. 1, the various contents are stored in the storage unit of the imaging distribution apparatus 1. These contents may have been read from outside the imaging distribution apparatus 1 or generated in the imaging distribution apparatus 1. The imaging distribution apparatus 1 may acquire contents from the servers and hosts provided on the network 3 or on the LAN (not shown) and store them in the storage unit, in addition to or in place of those contents thus far stored in the storage unit. One or more content servers may be provided, which store and provide, for example, at least one of the text content 1001, image/moving picture content 1002, BGM content 1003 and background content 1004, respectively.

The program-list distribution server 4, which holds program list information 2000, is connected to the AV client apparatus 2 by the network 3. The program-list distribution server 4 is connected to the imaging distribution apparatus 1, too, by a network 8. The network 8 may be one identical or different in configuration to or from the network 3. The program-list distribution server 4 may be connected to the imaging distribution apparatus 1 by a dedicated line, not by the network 8. The program-list distribution server 4 may be included in the imaging distribution apparatus 1. Further, the program-list distribution server 4 may be integrated with another server.

FIG. 2 is an exemplary configuration of the program distribution system. In this program distribution system, all of the imaging distribution apparatus 1, AV client apparatus 2, program-list distribution server 4, a scenario server 5 and a content server 6 are connected to the network 3.

In FIGS. 1 and 2, one imaging distribution apparatus, one AV client apparatus, one program-list distribution server, one scenario server and one content server are provided. Instead, each apparatus may be provided in plurality, and each server may be provided in plurality.

Further, all or some of the imaging distribution apparatus 1, program-list distribution server 4, scenario server 5 and content server 6 may be in integrated.

The basic data processing performed in the program distribution system according to this embodiment will be explained with reference to FIG. 3.

The AV client apparatus 2 acquires via the network 3 the program list information 2000 from the program-list distribution server 4, from the imaging distribution apparatus 1 or from another server. The AV client apparatus 2 then selects the program the user wants (e.g., program the user has designated) from the program list information 2000. The AV client apparatus 2 transmits, to the imaging distribution apparatus 1, a distribution request that contains the program ID of the program selected. Note that the program ID is a program identifier, such as unique ID or URI, acquired from the program list information 2000.

On receiving the distribution request containing the program ID, the main process unit 100 of the imaging distribution apparatus 1 interprets this request (Step S1) and extracts the program ID from the request.

Using the program ID as a key, the main process unit 100 searches the program ID-program scenario DB 10 for the program scenario 1000 associated with the program ID, thereby acquiring the program scenario 1000 (Step S2). The imaging distribution apparatus 1 may retrieve or acquire the program scenario 1000 from one or more scenario servers 5 provided on the network 3 and/or the LAN (not shown). In this case, the imaging distribution apparatus 1 retrieves and acquires the program scenario 1000 from the scenario server 5.

Next, the main process unit 100 of the imaging distribution apparatus 1 acquires contents from which to generate image data (i.e., text content 1001, image/moving picture content 1002, BGM content 1003 and background content 1004), one after another, while interpreting the program scenario 1000 acquired (Step S3). As described above, the contents elements are held in the imaging distribution apparatus 1. Instead, they may be held in one or more content servers provided on the network 3 or the LAN (not shown), so that they may be supplied to the imaging distribution apparatus 1 (that is, the apparatus 1 can retrieve or acquire these content elements).

Each of the content elements is converted to image data, undergoing the synthesis sequence described in the program scenario 1000 (e.g., screen layout, display timing, effects, etc.) (Step S4). Finally, each content element is encoded, providing an image stream, i.e., image data fit for streaming distribution (Step S5). The image stream thus obtained is distributed to the AV client apparatus 2, using a distribution protocol such as HTTP or RTP (Step S6).

Any image (or stream) generated from one program scenario is equivalent, in concept, to a TV-broadcast "program." A plurality of programs are combined and arranged in time axis, providing a data unit called "channel." Channel list information may be added to the information stored in the program-list distribution server 4, and the AV client apparatus 2 may be configured to select a broadcast program automatically after it has acquired the channel list information.

FIG. 4 shows an exemplary overall configuration of the imaging distribution apparatus 1 according to this embodiment. More precisely, FIG. 4 shows the internal configuration of the main process unit 100 shown in FIG. 1. The program ID-program scenario DB 10 and the various contents, which are illustrated in FIG. 4, have been described above.

As shown in FIG. 4, the main process unit 100 of the imaging distribution apparatus 1 comprises cache control units 11 to 14, a program ID-cache association table 20, a program retrieval unit 30, a distribution request reception-interpretation unit 40, a program scenario acquisition unit 101, a program scenario interpretation-control unit 102, a content acquisition unit 103, a data conversion unit 104, a stream generation unit (encoding unit) 105, a stream distribution unit 106, caches 111 to 114 and a cache-condition setting file 200. The cache control unit 11 and the cache 111 are provided to hold program scenarios. The cache control unit 12 and the cache 112 are provided to hold various contents. The cache control unit 13 and the cache 113 are provided to hold image scenes. The cache control unit 14 and the cache 114 are provided to hold moving pictures for streaming.

The caches incorporated in the main process unit 100 will be described.

The imaging distribution apparatus 1 adopts an architecture that can cache program scenario 1000, the content elements, the moving picture data generated in the apparatus 1 and the stream data (i.e., generated by encoding moving picture data). Therefore, the apparatus 1 can reduce the process load imposed on it.

That is, each process unit can has a cache control unit and a cache and can therefore automatically cache data in accordance to the instructions described in the cache-condition setting file 200. If the process unit receives any distribution request after receiving the first distribution request, it can convert information to image data and distribute the image data in a load-reducing scheme, not performing some or all of acquisition, conversion and encoding of the information.

The conditions of using the caches can be set by the manager who is in charge of the main process unit 100. The conditions may be, for example, as follows. The methods of achieving the conditions exemplified below will be described later.

(a) Any stream generated is cached in a server for the program designated beforehand, when the program is played back (distributed) for the first time, and the stream is used again to play back (distribute) the program for the second time.

(b) A stream of any program is generated and cached, if as many people as, or more people than, a preset number, have watched it.

(c) Each cache is archived every time the program is updated (periodically, for example, every day or every week, as done by the program scenario producer or the content provider), thereby automatically editing the old programs and the latest programs alike.

The cache control unit 11 and cache 111 for holding program scenarios, the cache control unit 12 and cache 112 for holding contents, the cache control unit 13 and cache 113 for holding image data, and the cache control unit 14 and cache 114 for holding stream data need not be all provided in the main process unit 100. The main process unit 100 only needs to have at least one cache and the control unit for it. Which cache should be provided in the unit 100 can be decided in consideration of the process load and use efficiency of the imaging distribution apparatus 1. (Each of caches 111 to 114 may be decided whether it should be provided or not, independently and arbitrarily.)

The main process unit 100 may have no cache control units and no caches. In this case, the program ID-cache association table 20 and the cache-condition setting file 200 are unnecessary, and the imaging distribution apparatus 1 operates as has been explained with reference to the flowchart of FIG. 3.

How the imaging distribution apparatus 1 operates if the main process unit 100 has the four caches specified above (or as shown in FIG. 4) will be explained with reference to FIG. 5.

FIG. 5 explains an operating sequence the imaging distribution apparatus 1 may perform in this case. For simplicity of explanation, assume that the program ID-program scenario DB 10 and the various contents exist in the imaging distribution apparatus 1.

On receiving a distribution request packet from the AV client apparatus 2, the distribution request reception-interpretation unit 40 interprets the content of the packet (Step S11) and extracts a program ID. The program ID is an identifier identifying a program scenario, and is a unit ID or URI. Note that the distribution request packet may contain a list of program IDs.

Next, the program retrieval unit 30 retrieves the program scenario identified by the program ID that has been designated by the distribution request reception-interpretation unit 40 and has therefore been extracted (Step S12). If any one of the caches 111 to 114 holds the data cached at the previous distribution, this data can be utilized. Therefore, an inquiry is made of the program ID-cache association table 20 before making an inquiry to the program ID-program scenario DB 10.

Whether the program ID-cache association table 20 contains an entry that corresponds to the program ID is determined (Step S13). If program ID-cache association table 20 contains no entries corresponding to the program ID, the process goes to Step S16, in which the program scenario acquisition unit 101 operates.

If program ID-cache association table 20 contains an entry corresponding to the program ID (if Yes in Step S13), the process goes to Step S14. It is then determined what restart position is described in the entry (Step S14). Further, it is determined again what restart position is described in the entry (Step S15). In accordance with the restart positions determined in Steps S14 and S15, a specific process unit (i.e., program scenario acquisition unit 101, content acquisition unit 103, data conversion unit 104, stream generation unit 105, or stream distribution unit 106) is controlled.

FIG. 6 is a diagram showing an example of a program ID-cache association table 20. In the example of FIG. 6, each entry contains a program ID (i.e., key), a restart position, and data items (e.g., file names) held in the caches 111 to 114, respectively.

No entries may be acquired in Step S13 from the program ID-cache association table 20, or an entry may be acquired in Step 13 and "program scenario acquisition unit 101" maybe described at the restart position of the entry acquired. In this case, the program scenario acquisition unit 101 is called by the program retrieval unit 30, and first makes an inquiry to the program ID-program scenario DB 10, about the program scenario corresponding to the required program ID. The program scenario acquisition unit 101 then acquires the program scenario from the program ID-program scenario DB 10 (Step S16).

Note that the program ID-program scenario DB 10 is a database that holds a plurality of program scenarios. In response to an inquiry having an program ID as key, the program ID-program scenario DB 10 supplies the program scenario identified by the program ID, to the main process unit 100. Note that the program ID-program scenario DB 10 may be replaced by an index table (e.g., Hashtable) or a Web server, either provided in an ordinary file system.

In this embodiment, two scenarios are used for each program, i.e., main program scenario (see FIG. 7) and sub-scenario for instructing operations (see FIG. 9). This embodiment is not limited to this. Further, in this embodiment, the program scenario is described by using XML. Nevertheless, this embodiment is not limited to this, either.

In the imaging distribution apparatus 1 that has the cache control unit 11 and cache 111, the program scenario acquisition unit 101 makes an inquiry to the program ID-cache association table 20, asking whether the table 20 has any data cached at the previous distribution, making an inquiry to the program ID-program scenario DB 10. If the table 20 has any data cached at the previous distribution, the program scenario acquisition unit 101 will acquire the data, without making no inquiries to the program ID-program scenario DB 10.

If no entries may be acquired in Step S13 from the program ID-cache association table 20, this means that the two types of program scenarios are not cached. (That is, no data is acquired even if an inquiry is made to the program ID-cache association table 20). In this case, the program scenario acquisition unit 101 acquires the two types of program scenarios from the program ID-program scenario DB 10 (Step S16).

If any entry is acquired in Step S13 and if "program scenario acquisition unit 101" is described at the restart position of the entry acquired, this means that one of the two types of program scenarios is not cached. In this case, the program scenario acquisition unit 101 makes an inquiry to the program ID-cache association table 20 before making an inquiry to the program ID-program scenario DB 10. The unit 101 thus acquires the cached program scenario from the cache 111, and makes an inquiry to the program ID-program scenario DB 10, about the program scenario not cached, and acquires this program scenario from the program ID-program scenario DB 10 (Step S16).

On the other hand, if an entry is acquired in Step S13, and if "content acquisition unit 103" is described at the restart position of the entry acquired, this means that the two types of program scenarios are not cached. In this case, the program scenario acquisition unit 101 does not operate, and two types of program scenarios, which are held in the cache 111, are utilized.

The imaging distribution apparatus 1 may not have the cache control unit 11 or the cache 111. In this case, the program scenario acquisition unit 101 acquires program scenarios at all times, except in the case where no program scenarios are required (for example, "stream distribution unit 106" is described at the restart position).

The program scenario acquisition unit 101 may acquire a program scenario. In this case, the program scenario acquisition unit 101 gives this program scenario to the cache control unit 11 if the program scenario acquired is found to be necessary in the cache control unit 11, on the basis of the content of the cache-condition setting file 200. And the program scenario acquisition unit 101 instructs the cache control unit 11 to cache the program scenario in the cache 111. The cache control unit 11 then receives the program scenario and stores them in the cache 111 (Step S16).

The manager in charge of the main process unit 100 sets the cache conditions in the cache-condition setting file 200, each cache condition for one program. The file 200 may describe that only a program scenario selected should be cached for a predetermine period (e.g., one day, one week, one month, or the like) or cached if the program scenario is found to have been distributed a specific number of times within a predetermined period (e.g., one day). Assume that each program describes particular instructions or a rule of specifying these instructions, each instructing which cache, cache 111, 112, 113 or 114, should be used, what data should be held in which cache and which is the "restart position," program scenario acquisition unit 101, content acquisition unit 103, data conversion unit 104, stream generation unit 105, or stream distribution unit 106.

On receiving an instruction from the program scenario acquisition unit 101, the cache control unit 11 saves the program scenario in the cache 111 (Step S16).

At this point, the cache 111 may hold the two types of program scenarios. In this case, the entry describing the "program ID" of the program, used as the program ID, the entry describing "content acquisition unit 103" used as the restart position the imaging distribution apparatus 1 has for the next identical program scenario, and the entry describing, for example, the "file name" of each program scenario, which identifies the data cached in the cache 111, are registered in the program ID-cache association table 20.

The cache 111 may not hold one of the two types of program scenarios. If this is the case, the entry describing the "program ID" of the program, used as the program ID, the entry describing "program scenario acquisition unit 101" used as the restart position the imaging distribution apparatus 1 has for the next identical program scenario, and the entry describing, for example, the "file name" of the program scenario, which identifies the data cached in the cache 111, are registered in the program ID-cache association table 20.

The program scenarios may be cached in the cache 111, either in their own form or in internally processed form, such as DOM, generated by expanding the scenarios.

As is obviously described in the program ID-cache association table 20 of FIG. 6, the conversion of information to image data is started at the "content acquisition unit 103" if the program ID is "10013." In this case, the program scenario has already been cached. Therefore, the program scenario acquisition unit 101 need not operate at all in response to the second distribution request, et seq., coming from the AV client apparatus 2. Thus, the process can be started again at the content acquisition unit 103. In this case, the process is started again in the following sequence. First, the program retrieval unit 30 makes an inquiry to the program ID-cache association table 20. If the corresponding entry is obtained, the program retrieval unit 30 informs the program scenario interpretation-control unit 102 of the "content acquisition unit 103" as the restart position, and then performs the ensuing process.

No program scenarios may be acquired in Step S16. If this is the case, the main process unit 100 generates an appropriate error message and transmits the error message to the AV client apparatus 2.

In Step S16, the program scenario acquisition unit 101 may acquire the program scenario identified by the program ID. Alternatively, an entry may be acquired in Step S13 and any one of the "content acquisition unit 103," "data conversion unit 104," "stream generation unit 105" and "stream distribution unit 106" may be described at the restart position of the entry. In either case, the program scenario interpretation-control unit 102 interprets and controls the program scenario.

The program scenario is interpreted and controlled as will be explained below.

Unless the "stream distribution unit 106" is described at the restart position of the entry, the program scenario interpretation-control unit 102 interprets the content based on the corresponding program scenario. The unit 102 gives instructions, controlling the various process units (i.e., all or some of the content acquisition unit 103, the data conversion unit 104, the stream generation unit 105, or the stream distribution unit 106) (Steps S17 to S20). The program scenario interpretation-control unit 102 gives instructions to the process units and controls them in accordance with the content of the cache-condition setting file 200.

If the "stream distribution unit 106" is described at the restart position of the entry, the program scenario interpretation-control unit 102 gives an instruction to only the stream distribution unit 106, controlling the unit 106 (Step S20).

When controlled by the program scenario interpretation-control unit 102 in accordance with the content of the program scenario, the content acquisition unit 103 acquires, one after another, content elements that will be synthesized to generate an image scene (Step S17).

These content elements are the text content 1001, image/moving picture content 1002, BGM content 1003 and background content 1004. These content elements may be used as raw material for generating image scenes. If the content elements are held in a Web server, they are acquired by means of HTTP communication. If ordinary Web APIs, such as RSS, are available, they may be utilized to extract the content elements. If Web APIs are not available, the technique known as "scraping" may be used to automatically extract necessary elements from a given HTML description.

FIG. 7 shows an exemplary description (new_main_xml) of the main program scenario.

The main program scenario description of FIG. 7 has various program elements. Of the program elements, the tile of the (main) program scenario and the script version are declared as "news" and "0.1," respectively. Of the program elements, plugin elements are arranged, indicating various conversions. In this instance, the first conversion is "Subscription RSS," the second conversion is "Filter_removeTag," the third conversion is "Filter_ToSpeak," and the fourth conversion is "Presentation_Array_Scene." The plugin element designates various settings, in accordance with its child element (i.e., option element), its id attribute, and its value attribute.

Based on the content described above, the program scenario interpretation-control unit 102 instructs the content acquisition unit 103 to perform the following process.

In the first conversion, the first option element, id="urn," indicates that information should be acquired from url identified with the value attribute, thereby to read the structure as RSS from the information acquired. The next option element, id="return," indicates that the structure (the elements of RSS) thus read should be stored in a sequence called "example_array" identified with the value attribute.

Figure 8:
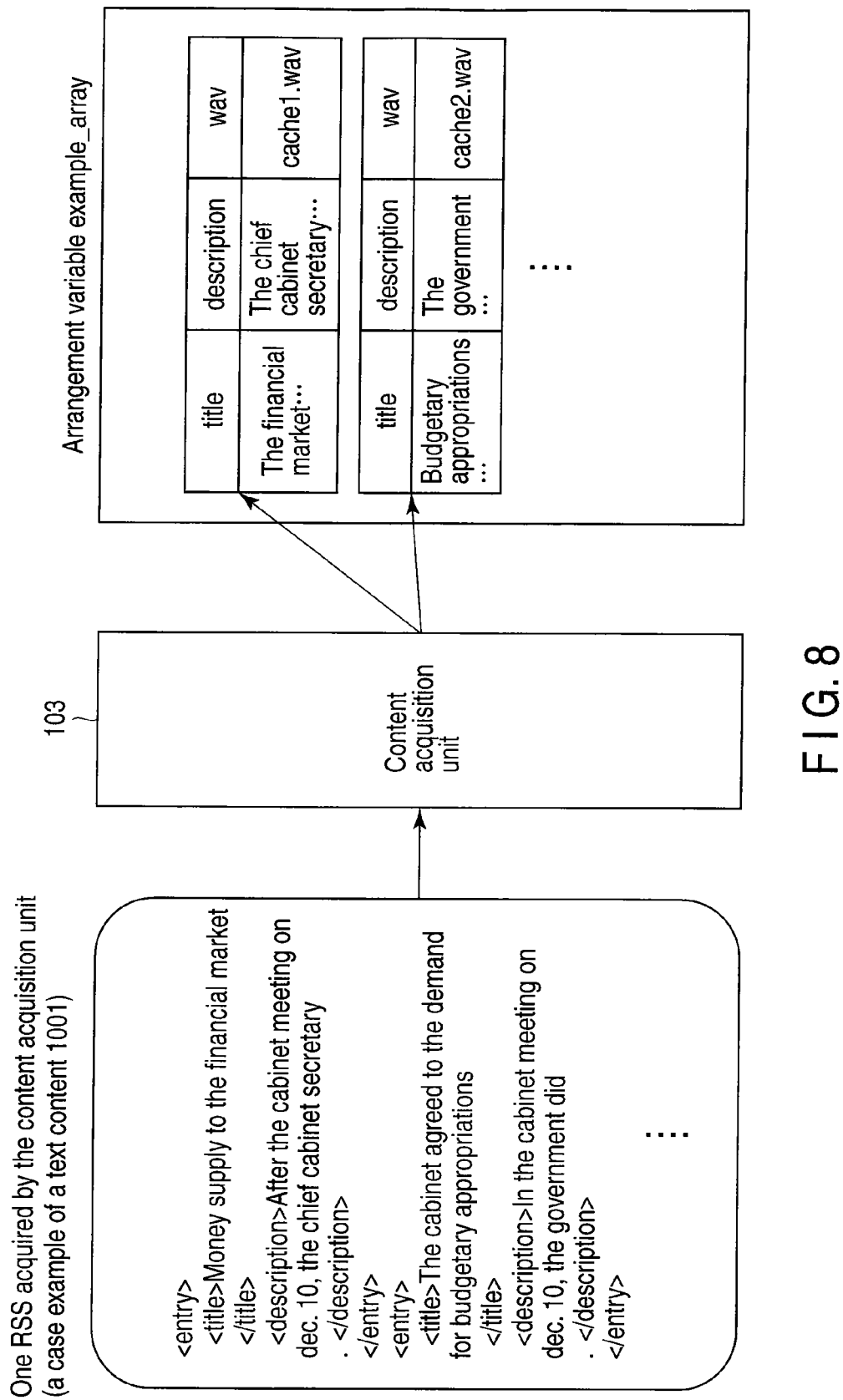
FIG. 8 is a diagram explaining a data conversion process performed by the content acquisition unit of the imaging distribution apparatus.

FIG. 8 explains a data conversion process performed by the content acquisition unit 103 to acquire the text content 1001 and store this content 1001 in the sequence variable "example_array." In this instance, the title of "Money supply to the financial market" and the description of "After the cabinet meeting on December 10, the Director of the Cabinet . . . " are extracted as one set, or the title of "The Cabinet agreed to the demand for budgetary appropriations" and the description of "In the cabinet meeting on December 10, the government did . . . " are extracted as another set.

In this embodiment, a Hashtable is used as data structure that holds the content acquired. Instead, any other data structure may be used, only if the identifiers of the data items are associated with the data contents and held in the order the data contents are arranged.

In the case shown in FIG. 7, after Subscription RSS has been converted, Filter removeTag is converted. This conversion is performed to remove superfluous elements, such as HTML tags. The value input is an example_array sequence variable, and the output is stored in the example_array sequence variable. Symbol "$" may be added to the head of this variable if the variable is referred to as an input.

After the superfluous elements have been removed, Filter_ToSpeak is converted. This conversion is performed to achieve voice synthesis on the information now free of tags. The information is converted to, for example, a wav file and then saved as an element (cache1.wav, cache2.wav) that should be added to example_array.

At the last plugin, Presentation_Array_Scene is converted. This conversion is followed by a process which uses, as input, the elements of example_array, generated through the above-mentioned three conversions and which is based on the program scenario for instructing operations (see FIG. 9).

Each plugin is a module incorporated in the content acquisition unit 103 and data conversion unit 104, both provided in the imaging distribution apparatus 1. Nonetheless, the plugin can be expanded as needed, and new plugin's can be introduced.

FIG. 9 is a diagram illustrating an example of a program scenario (sub-scenario) (i.e., news_gmg.xml) for instructing operations.

In the case shown in FIG. 9, a gmg element exits first, i.e., gmg title. The title and script version of the "program scenario (for instructing operations)" are declared as "news" and "0.1," respectively. Among the gmg elements are various ones for instructing operations. Image element defines the process of first acquiring a designated image from the URL of the image and then drawing the image at a designated coordinate position and in a designated size. For any image having id "bgimage," URL is a relative address. For any image having id "photo," URL may be an absolute address. Using a communications protocol such as HTTP or RTP, the content acquisition unit 103 acquires an image file from the URL source. The next element, i.e., Text element having id "title," defines the process of drawing the value of the title variable obtained from the above-mentioned example_array sequence element, at a designated coordinate position and in a designated size. Similarly, the Text element having id "desc" defines the process of drawing the value of the description variable obtained from the above-mentioned example_array sequence element, at a designated coordinate position and in a designated size. The next element, i.e., Box element, defines the process of drawing a rectangle at a designated coordinate position and in a designated size. The program scenario interpretation-control unit 102 instructs the content acquisition unit 103 to acquire all elements, but Box element, in an appropriate manner.

The content acquisition unit 103 acquired any necessary contents, such as text content 1001, image/moving picture content 1002, BGM content 1003 and background content 1004, in accordance with the instruction it has received. If the imaging distribution apparatus 1 has the cache control unit 12 and cache 112, however, the content acquisition unit 103 makes an inquiry to the program ID-cache association table 20 before acquiring the above-mentioned contents, asking whether the table 20 has any data cached at the previous distribution. If the table 20 has such data, the content acquisition unit 103 acquires the data held in the cache 112 (Step S17).

As described in the program ID-cache association table 20 of FIG. 6, the conversion of information to image data is started at the "content acquisition unit 103" if the program ID is "10014."

In this case, some program scenarios necessary for the conversion have been cached. (Note that program scenarios can be cached, too.) Hence, the program scenario acquisition unit 101 need not acquire any cached content, in response to the second distribution request, et seq., coming from the AV client apparatus 2. However, no text contents are cached with this entry, though they are needed in the program scenario. Thus, for any content not cached, the content acquisition unit 103 acquires contents in accordance with the content of the program scenario.

If the imaging distribution apparatus 1 has no caches, the content acquisition unit 103 transfers various contents it has acquired, to the cache control unit 12. the content acquisition unit 103 instructs the cache control unit 12 to cache the contents in the cache 112. The cache control unit 12 receives the contents and stores them in the cache 112 (Step S17).

In the example of FIG. 6, the program ID may be "10014." In this case, the BGM content and the background content are cached in accordance with the content of the cache-condition setting file 200.

The rule of generating the content file corresponding to each scene and the name of the content file can be defined by any method. For example, such a file name as follows may be generated for each content element that can have a unique id:

(Program ID)+(scene ID)+(content element id).extension

The extension for the image element, Movie element (moving-picture element) or Music element (BGM element) can be the extension url of the file name. The extension for any Text element can be txt. The extension for the scene ID will be described later.

The sequence of restarting the process is almost the same as the above-described sequence of caching the program scenario.

After the content acquisition unit 103 has acquired contents, the data conversion unit 104 converts the contents to image data (i.e., synthesizing the contents into an image scene) (Step S18).

The program scenario interpretation-control unit 102 instructs the data conversion unit 104 to synthesize each content in accordance with such a program scenario as shown in FIG. 9. The background image (id="bgimage") and the photo image (id="photo") are displayed at the coordinate positions and in sizes that have been designated. Further, a slide-in effect from the left side of the screen is performed for 0.5 seconds on the title text (id="title"), displaying the title text. A fade-in effect from the top of the screen is performed for 0.5 seconds on the description (id="desc"), displaying the description. Moreover, a rectangle is drawn at a designated coordinate position and in a designated size on the same screen. The display and drawing pause for 5 seconds when "Sleep" is designated. In this instance, two or more title-description pairs are contained in each example_array sequence element, and one scene is generated for each title-description pair. New scenes are sequentially generated for all title-description pairs contained in the example_array sequence, each scene for 5 seconds. How the scenes are generated and how they are distinguished from one another may be defined in the system by using a scene description scheme.

The imaging distribution apparatus 1 may have the cache control unit 13 and cache 113. In this case, the data conversion unit 104 makes an inquiry to the program ID-cache association table 20 before generating the above-mentioned scenes, asking whether the table 20 has any data cached at the previous distribution. If the table 20 has such data, the data conversion unit 104 acquires the data held in the cache 113 (Step S18).

In the program ID-cache association table 20 of FIG. 6, it is specified that the conversion of information to image data is started at the "content acquisition unit 103" if the program ID is "10014." As pointed out before, the program scenario acquisition unit 101 need not acquire any cached content, in response to the second distribution request, et seq., coming from the AV client apparatus 2. However, the content (10014s2bgm.mp3, 10014s2bgimg.jpg) is acquired from the cache 112. On the other hand, the content not cached (e.g., text content) is acquired anew. These contents are transferred to the data conversion unit 104. The cache 113 has already held image files (10014s1.avi, 10014s3.avi) equivalent to scene 1 and scene 3. The data conversion unit 104 uses the cached image files in their own form and generates an image file equivalent to scene 2 (which is not a cached scene) by synthesizing the various contents transferred from the content acquisition unit 103 in accordance with the program scenario (for designating moving pictures).

Figure 10:
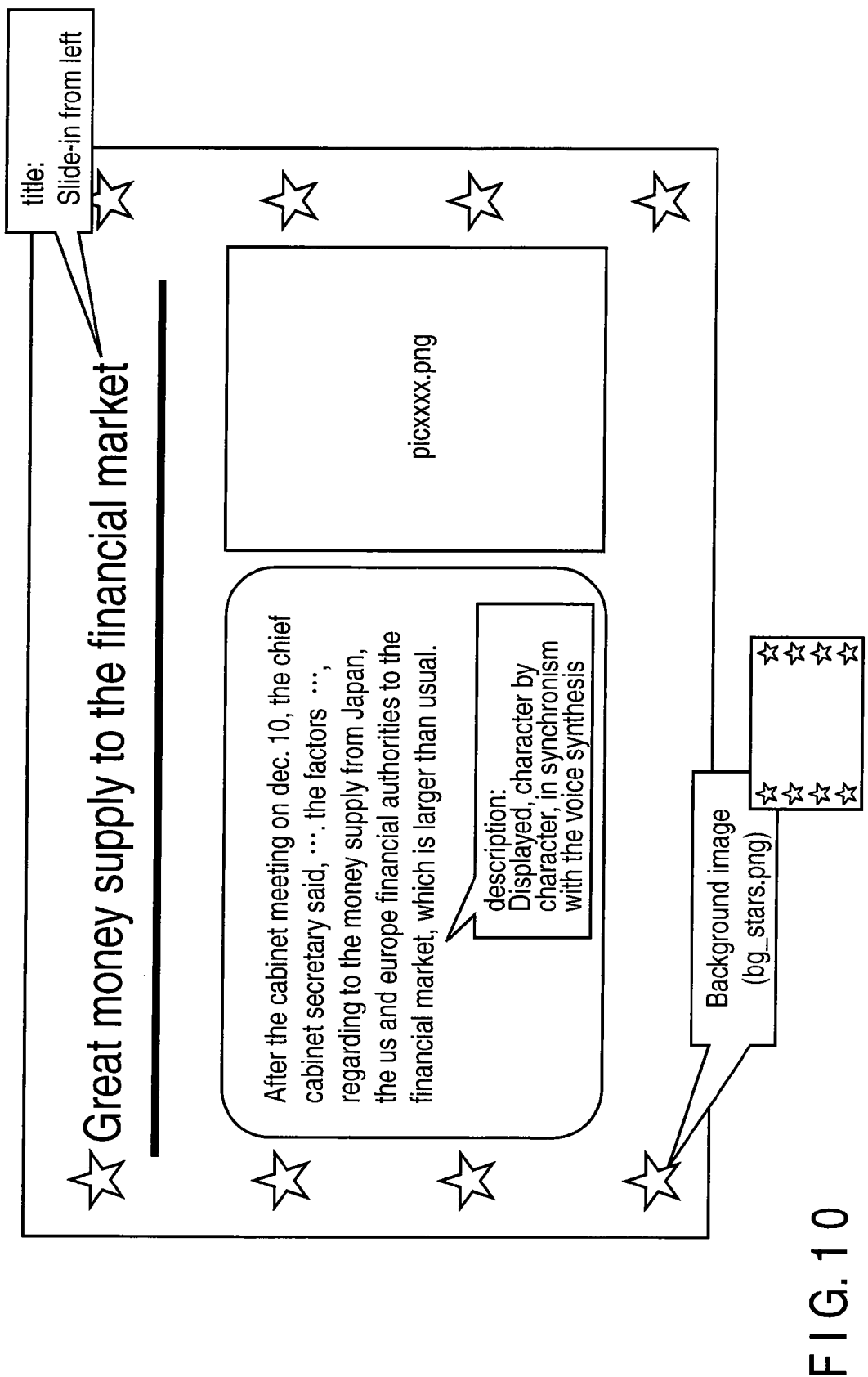
FIG. 10 is a diagram illustrating an exemplary scene generated in the apparatus.

FIG. 10 illustrates an exemplary scene generated.

The rule of generating a production unit (length), production timing and name of an image file equivalent to one scene is defined in any way desirable. For example, the production unit may be that part of the image, which lasts until a Sleep element appears. One scene may be generated in such a file name as shown below, upon lapse of the dur period of the Sleep element:

(Program ID)+(scene ID).avi

If the imaging distribution apparatus 1 has no caches, the data conversion unit 104 transfers various image scenes generated, to the cache control unit 13 when these image scenes are necessary in view of the content of the cache-condition setting file 200. The data conversion unit 104 instructs the cache control unit 13 to cache the image scenes in the cache 113. The cache control unit 13 receives the image scenes and stores them in the cache 113 (Step S18). In the program ID-cache association table 20 of FIG. 6, it is specified that if the program ID is "10014," the image file (10014sl.avi, 10014s3.avi) equivalent to scene 1 and scene 3 should be cached in accordance with the content of the cache-condition setting file 200.

After the data conversion unit 104 has generated the image scenes, the stream generation unit 105 encodes the image scenes, one after the other, generating a stream that should be distributed (Step S19). That is, the stream generation unit 105 encodes the image scenes in accordance with the instruction coming from the program scenario interpretation-control unit 102, generating a stream. The stream thus generated is transferred to the controlling the unit 106. In this encoding, the image scenes are converted to data of a streaming format such as H.264/MPEG-4 AVD or Flash Movie Windows Media™.

If the If the imaging distribution apparatus 1 has the cache control unit 14 and cache 114, the stream generation unit 105 makes an inquiry to the program ID-cache association table 20 before generating the above-mentioned stream, asking whether the table 20 has any data cached at the previous distribution. If the table 20 has such data, the stream generation unit 105 acquires the data held in the cache 114.

The rule of generating the stream file can be defined to be any one desirable. For example, the stream file may have such a file name as exemplified below, by sing the program ID:

(Program ID).Mp4

If the imaging distribution apparatus 1 has no caches, the stream generation unit 105 encodes the image scenes in accordance with the content of the cache-condition setting file 200, generating a stream. If the stream generated must be cached, the unit 105 instructs the control unit 13 to save the stream in the cache 113 (Step S19). If the program ID is "10010" in FIG. 6, the stream file (10010.mp4) will be cached in accordance with the content of the cache-condition setting file 200.

The stream distribution unit 106 distributes the stream, thus generated, to the AV client apparatus 2, which has transmitted the distribution request, by using a transport protocol such as HTTP or RTP (Step S20).

An entry may be acquired in Step S13, and the "stream distribution unit 106" is described at the restart position of the entry (in Step S14), the stream distribution unit 106 acquires the data held in the cache 114 and distributes this data in the form of a stream (Step S20).

In the program ID-cache association table 20 of FIG. 6, it is specified that if the program ID is "10010," the process of converting information to image data should be restarted at the "stream distribution unit 106." In response to the second distribution request, et seq., coming from the AV client apparatus 2, after referring to the entry held in the program ID-cache association table 20, the program retrieval unit 30 instructs the program scenario interpretation-control unit 102 to call the stream distribution unit 106. The program scenario interpretation-control unit 102 then controls the stream distribution unit 106. Thus, the process goes to the stream distribution unit 106. The stream file (10010.mp4) already cached is transferred to the stream distribution unit 106. The stream distribution unit 106 thus distributes the stream the user wants.

As described above, the data conversion unit 104 generates images for scenes, respectively. Thereafter, the stream generation unit 105 encodes the image scenes into a stream, by using a streaming format. Instead, the stream generation unit 105 may encode the image scenes while the data conversion unit 104 is generating images.

As indicated above, the cache control units and the caches are connected, independently of one another, to the program scenario acquisition unit 101, content acquisition unit 103, data conversion unit 104 and stream generation unit 105. Nonetheless, they may be connected to one cache control unit and one cache, both common to the process units (units 101, 103, 104 and 105).

Moreover, the stream generation unit 105, the cache control unit 14, and the cache 114 may independently operate in the form of hardware units, each having a dedicated encoder chip. If this is the case, the cache control unit 13 and the cache 113 can operate in the form of hardware units, too.

As has been described, this embodiment can combine content information items (text, BGM, background, image, and moving picture) available in the servers or hosts provided on a network such as the Internet or in the apparatus incorporating the embodiment, can convert these information items to image data (program), and can distribute the image data, in the form of a stream, to an AV client apparatus. The embodiment can dynamically reduce is process load that increases in proportion to the number of programs it processes and the number of users who use it.

In any server-client model, this embodiment can convert information to image data and distribute the image data, while dynamically reducing its process load even if the clients increase in number and the programs it processes increases in number.

The image data generated by converting the information can be distributed in the form of a stream such, as IPTV or VoD, or downloaded data. The image data can be received in the same procedure as in various AV client apparatuses such as PC, STB, TV and video recorders. This can help to reduce the cost of developing receivers.

(Second Embodiment)

In the imaging distribution apparatus 1 according to the first embodiment, cache control is performed in various processes in accordance with the content of the cache-condition setting file 200. If the cached content remains unchanged, the cache cannot be updated when program scenarios or various contents are updated. In view of this, the second embodiment is designed to detect quickly that the program scenarios and the contents have been updated and to feedback the updated scenarios and contents to the cache control.

The second embodiment will be explained, describing mainly the points distinguishing the embodiment from the first embodiment.

FIG. 11 shows an exemplary overall configuration of a imaging distribution apparatus according to the present embodiment. The imaging distribution apparatus 1 is identical to the apparatus 1 of FIG. 4 (except that it has at least one set of a cache control unit and a cache). Different from the apparatus 1 of FIG. 4, the imaging distribution apparatus 1 has two additional components, i.e., scenario-updating detection/notification unit 2001 and a content-updating detection/notification unit 2002. Note that FIG. 11 shows only those components of the imaging distribution apparatus 1, which cooperate with the scenario-updating detection/notification unit 2001 and content-updating detection/notification unit 2002.

The scenario-updating detection/notification unit 2001 has two functions. The first function is to detect whether the content of the program scenario has been updated. The second function is to inform the program ID-cache association table 20 that the content of the program scenario has been updated, upon detecting this event. The content-updating detection/notification unit 2002 has two functions, too. The first function is to detect whether various contents have been updated. The second function is to inform the program ID-cache association table 20 that the contents have been updated, upon detecting this event.

Various methods are available to inform the table 20 of the content updating. One method is to insert a hook in API so that the API may be automatically called and detected when program scenario or the contents registered or saved are deleted or when they are updated and then registered or saved again. Another method is to inform the scenario-updating detection/notification unit 2001 of the content updating specifically. Still another method is to scan periodically the files that may be used as program scenarios or various contents, to determine whether the files differ from the time stamp information hitherto saved, thereby to detect whether the contents have been updated or not.

Figure 12:
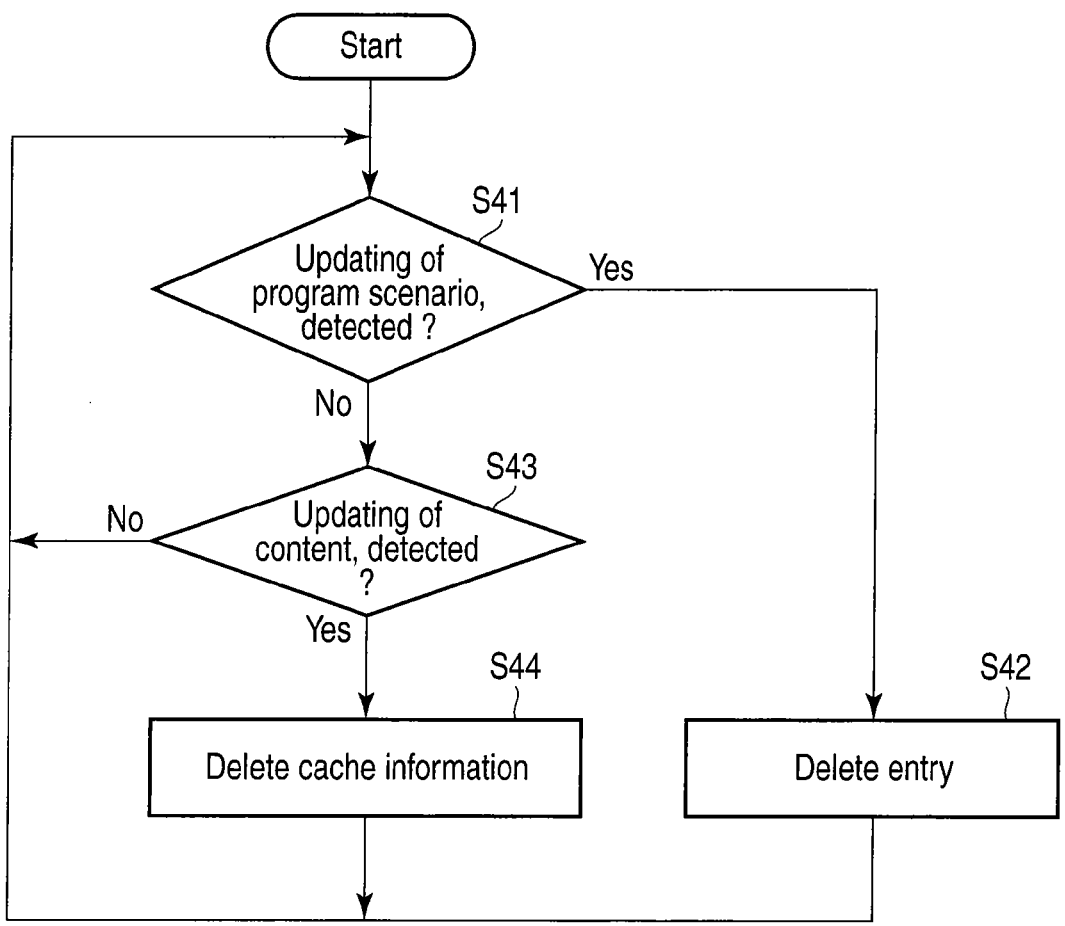
FIG. 12 is a flowchart explaining the sequence of an update process performed in the second embodiment.

FIG. 12 explains the sequence of an update process performed in the present embodiment.

First, it is determined whether the scenario-updating detection/notification unit 2001 has detected the updating of a program scenario (Step S41). If Yes in Step S41, the unit 201 requests that the entry (program ID, restart position, and data items held in caches 111 to 114) about the program ID be deleted from the program ID-cache association table 20 (Step S42).

In order to delete the entry, the program ID-cache association table 20 requests that the cache control units 11 to 14 should delete cache files that manage the caches 111 to 114 (which may hold program scenarios, various contents, image scenes, and moving pictures for streaming, respectively). In response to this request, the cache control units 11 to 14 delete the cache files. The process is terminated at this point.

Then, whether the content-updating detection/notification unit 2002 has detected the updating of a content is determined (Step S43). If Yes in Step S43, the unit 2002 requests that the cache information about the content (i.e., the corresponding item held in the cache 112) be deleted from the program ID-cache association table 20 (Step S44).

To have the cache information deleted from it, the program ID-cache association table 20 requests that the cache control unit 12 that controls it should delete the associated cache file. If the cache file exists in the cache 113, along with the entry, this cache control unit 13 is requested to delete only the cache file of the image scene that uses the content updated. If the cache file exists in the cache 114, the cache control unit 14 is requested to delete this cache file.

After the cache control units have deleted cache files in response to the deletion requests, the restart position may be the "data conversion unit 104" or the "stream generation unit 105." In this case, the restart position is changed to the 2 content acquisition unit 103." The process is thereby terminated. (Using the updated content, the restart position can be changed back to the "data conversion unit 104" or the "stream generation unit 105" after a new cache is generated.) The restart position need not be changed if it is the "program scenario acquisition unit 101" or the "content acquisition unit 103."

If the program scenario is cached when the restart position is the "stream distribution unit 106," the restart position is changed to the "content acquisition unit 103." If the program scenario is not cached, the restart position may be changed to the "program scenario acquisition unit 101" (The position may be switched back to the "stream distribution unit 106" after a new cache is generated by using the updated content). If the restart position is the "stream distribution unit 106," the cache file may be deleted, together with the corresponding entry, as in the case where the updating of the program scenario is detected.

(Third Embodiment)

In the embodiments thus far described, program scenarios having the same ID can provide images of different programs, if the program scenarios or various contents are updated. This enables the user to watch the image of the latest content at all times, but cannot meet the user's demand of watching the content images broadcast in the past, too. A third embodiment is an apparatus that adopts an archive concept, managing the history of the user's watching programs and thereby enabling the user to watch again any program the user has watched before.

The third embodiment will be explained, describing mainly the points distinguishing the embodiment from the first embodiment.

FIG. 13 shows an exemplary overall configuration of a imaging distribution apparatus 1 according to the present embodiment. The imaging distribution apparatus 1 is identical to the apparatus 1 of FIG. 4 (except that it has at least the cache control unit 14 and the cache 114). Different from the apparatus 1 of FIG. 4, the imaging distribution apparatus 1 has one additional component, i.e., archive 3001. Note that FIG. 13 shows only those components of the imaging distribution apparatus 1, which cooperate with the archive 3001.

FIG. 14 shows an example of a program ID-cache association table 20 used in this embodiment. This program ID-cache association table 20 is different from the program ID-cache association table 20 of FIG. 6, in that the attribute of the archive 3001 is added.

At the time of updating the program scenario or the content, the cache-condition setting file 200 is set to generate an archive for stream distribution. Instead, the timing of generating the archive may be set periodically, for example, once a day or once a week.

In accordance with the instruction coming from the cache-condition setting file 200, the program scenario interpretation-control unit 102 controls the stream generation unit 105. So controlled, the stream generation unit 105 instructs the cache control unit 14 to generate a cache for the stream file at the time the program scenario or the content is generated. If the cache 114 holds the stream file of the same program ID, which has been generated before, the archive 3001 changes the name of this stream file to the name of a stream file having a different program ID. The stream file now having new name is stored in the file system provided in the archive 3001.

For example, the cache control unit 14 changes the name of the stream file "10010.mp4" it has held before, to "10020.mp4," when the program scenario or content having the program ID "10010" is updated. The stream file is thereby set under the control of the archive 3001. The cache control unit 14 informs the program ID-cache association table 20 that the program ID of the stream file cached before has been changed to "10020" and that the stream file has been stored into the archive 3001, thereby requesting the table 20 to generate such an entry as shown in FIG. 14.

If the request for the distribution of the program having the program ID "10020" comes from the AV client apparatus 2, the program retrieval unit 30 refers to the corresponding entry contained in the program ID-cache association table 20. The program retrieval unit 30 then transmits "10020.mp4" stored in the archive 3001, as an argument, to the program scenario interpretation-control unit 102, so that the process may goes to the stream distribution unit 106. The ensuing processes are thereby performed.

The content-updating detection/notification unit 2002 and the archive 3001, which are used in the second and third embodiments, respectively, may be used in another embodiment.

In the first to third embodiments described above, the imaging distribution apparatus 1 is used as a server or host provided on the Internet. Instead, a PC or AV apparatus existing in the house may be used as a host. That is, any apparatus that can work as a server for the AV client apparatus 2 can be used as host. Hence, the imaging distribution apparatus 1 can use, as host, even a mobile terminal such as a mobile telephone, a portable game apparatus or a portable AV apparatus, if the mobile terminal can function as a server.

The functions described above may be described in software items and performed by an appropriately designed computer.

The present embodiment can be embodied as a program that enables computers to perform an operation sequence, to function as a specific means or to achieve a specific function. In addition, the embodiment can be practically used in the form of a computer-readable recording medium recording such a program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging distribution apparatus comprising:
a reception unit configured to receive a distribution request for distribution of a specific program from a client apparatus via a network;
a program scenario acquisition unit configured to acquire a program scenario corresponding to the specific program requested by the distribution request;
a content acquisition unit configured to acquire a plurality of information contents based on the program scenario;
a conversion unit configured to convert the information contents to image scene based on the program scenario;
an encoding unit configured to encode the image scene, to generate a stream;
a stream distribution unit configured to distribute the stream to the client apparatus via the network;
a first cache unit configured to cache the program scenario acquired by the program scenario acquisition unit;
a second cache unit configured to cache the information contents acquired by the content acquisition unit;
a third cache unit configured to cache the image scene generated by the conversion unit;
a fourth cache unit configured to cache the stream generated by the encoding unit;
a table storage unit configured to store a plurality of entries, each entry including a program identification data item and a start position data item, in correspondence with each other, the program identification data item identifying a program, the start position data item indicating where a process should be started when the reception unit receives the distribution request next, at the program scenario acquisition unit, at the content acquisition unit, at the conversion unit, at the encoding unit, or at the stream distribution unit, wherein each entry stored in the table storage unit further includes a first identification data item identifying the program scenario cached in the first cache unit, a second identification data item identifying the information content cached in the second cache unit, a third identification data item identifying the image scene cached in the third cache unit and a fourth identification data item identifying the stream cached in the fourth cache unit about the program identified by the program identification data item;
a control unit configured to refer to the table storage unit based on the program identification data item identifying the specific program requested for by the distribution request, when the reception unit receives the distribution request; to determine where the process should be started, at the program scenario acquisition unit, at the content acquisition unit, at the conversion unit, at the encoding unit, or at the stream distribution unit, based on the start position data item contained in an entry, if any, which corresponds to the program identification data item; to determine that the process should be started at the program scenario acquisition unit if the table storage unit stores no entries that correspond to the program identification data item;
a first cache control units configured to save the program scenario in the first cache units, to acquire the program scenario from the first cache units, and to register the first identification data item into the entry of the table storage unit;
a second cache control units configured to save the information contents in the second cache units, to acquire the information contents from the second cache units, and to register the second identification data items into the entry of the table storage unit;
a third cache control units configured to save the image scene in the third cache units, to acquire the image scene from the third cache units, and to register the third identification data item into the entry of the table storage unit; and
a fourth cache control units configured to save the stream in the fourth cache units, to acquire the stream from the fourth cache units, and to register the fourth identification data item into the entry of the table storage unit.

2. The apparatus according to claim 1, wherein the program scenario acquisition unit acquires the program scenario via the network.

3. The apparatus according to claim 1, further comprising a program scenario storage unit configured to store a plurality of program scenarios corresponding to a plurality of programs, respectively,
wherein the program scenario acquisition unit acquires the program scenario from the program scenario storage unit.

4. The apparatus according to claim 1, wherein the content acquisition unit acquires the information contents via the network.

5. The apparatus according to claim 1, further comprising a content storage unit configured to store a plurality of information contents,
wherein the content acquisition unit acquires the information contents from the content storage unit.

6. The apparatus according to claim 1, further comprising:
a scenario-updating detection/notification unit configured to detect whether the program scenario has been updated,
wherein, when the scenario-updating detection/notification unit detects that the program scenario has been updated, the entry that corresponds to the program identification data item identifying the program corresponding to the program scenario updated is deleted from the table storage unit, and all cached data about the program scenario updated is deleted from the first to fourth cache units.

7. The apparatus according to claim 1, further comprising an archive unit configured to save the stream distributable to the client apparatus by the stream distribution unit,
wherein, when the stream about the specific program is changed in content, the stream about the specific program not changed yet, is saved in the archive unit.

8. The apparatus according to claim 7, wherein, when the reception unit receives a distribution request requesting for distribution of the specific program not changed yet in content, the stream distribution unit distributes the stream about the specific program not changed yet, which is saved in the archive unit.

9. A imaging distribution method comprising:
receiving, at a reception unit, a distribution request for distribution of a specific program from a client apparatus via a network;
acquiring, at a program scenario acquisition unit, a program scenario corresponding to the specific program requested for by the distribution request;
caching the program scenario acquired by the program scenario acquisition unit into a first cache unit;
acquiring, at a content acquisition unit, a plurality of information contents based on the program scenario;

caching the information contents acquired by the content acquisition unit into a second cache unit;

converting, at a conversion unit, the information contents to image scene based on the program scenario;

caching the image scene generated by the conversion unit into a third cache unit;

encoding, at a encoding unit, the image scene, to generate a stream;

caching the stream generated by the encoding unit into a fourth cache unit;

distributing, at stream distribution unit, the stream to the client apparatus via the network;

storing a plurality of entries into an association table, each entry including a program identification data item and a start position data item, in correspondence with each other, the program identification data item identifying a program, the start position data item indicating where a process should be started when the reception unit receives the distribution request next, at the program scenario acquisition unit, at the content acquisition unit, at the conversion unit, at the encoding unit, or at the stream distribution unit, wherein each entry stored in the association table further includes a first identification data item identifying the program scenario cached in the first cache unit, a second identification data item identifying the information content cached in the second cache unit, a third identification data item identifying the image scene cached in the third cache unit and a fourth identification data item identifying the stream cached in the fourth cache unit about the program identified by the program identification data item;

referring to the table storage unit based on the program identification data item identifying the specific program requested for by the distribution request, when the reception unit receives the distribution request; determining where the process should be started, at the program scenario acquisition unit, at the content acquisition unit, at the conversion unit, at the encoding unit, or at the stream distribution unit, based on the start position data item contained in an entry, if any, which corresponds to the program identification data item;

determining that the process should be started at the program scenario acquisition unit if the table storage unit stores no entries that correspond to the program identification data item.

10. A non-transitory computer readable medium storing instructions of a computer program which when executed by a computer results in performance of steps comprising:

receiving, at a reception unit, a distribution request for distribution of a specific program from a client apparatus via a network;

acquiring, at a program scenario acquisition unit, a program scenario corresponding to the specific program requested for by the distribution request;

caching the program scenario acquired by the program scenario acquisition unit into a first cache unit;

acquiring, at a content acquisition unit, a plurality of information contents based on the program scenario;

caching the information contents acquired by the content acquisition unit into a second cache unit;

converting, at a conversion unit, the information contents to image scene based on the program scenario;

caching the image scene generated by the conversion unit into a third cache unit;

encoding, at a encoding unit, the image scene, to generate a stream;

caching the stream generated by the encoding unit into a fourth cache unit;

distributing, at stream distribution unit, the stream to the client apparatus via the network;

storing a plurality of entries into an association table, each entry including a program identification data item and a start position data item, in correspondence with each other, the program identification data item identifying a program, the start position data item indicating where a process should be started when the reception unit receives the distribution request next, at the program scenario acquisition unit, at the content acquisition unit, at the conversion unit, at the encoding unit, or at the stream distribution unit, wherein each entry stored in the association table further includes a first identification data item identifying the program scenario cached in the first cache unit, a second identification data item identifying the information content cached in the second cache unit, a third identification data item identifying the image scene cached in the third cache unit and a fourth identification data item identifying the stream cached in the fourth cache unit about the program identified by the program identification data item;

referring to the table storage unit based on the program identification data item identifying the specific program requested for by the distribution request, when the reception unit receives the distribution request;

determining where the process should be started, at the program scenario acquisition unit, at the content acquisition unit, at the conversion unit, at the encoding unit, or at the stream distribution unit, based on the start position data item contained in an entry, if any, which corresponds to the program identification data item;

determining that the process should be started at the program scenario acquisition unit if the table storage unit stores no entries that correspond to the program identification data item.

* * * * *